United States Patent Office 3,419,045
Patented Dec. 31, 1968

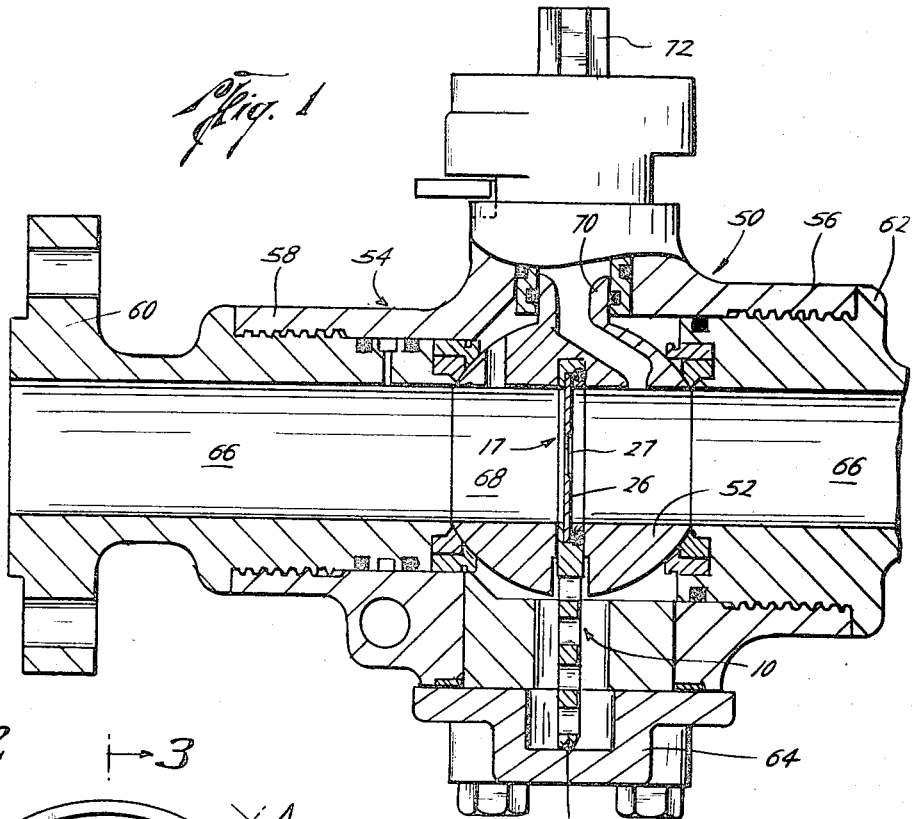
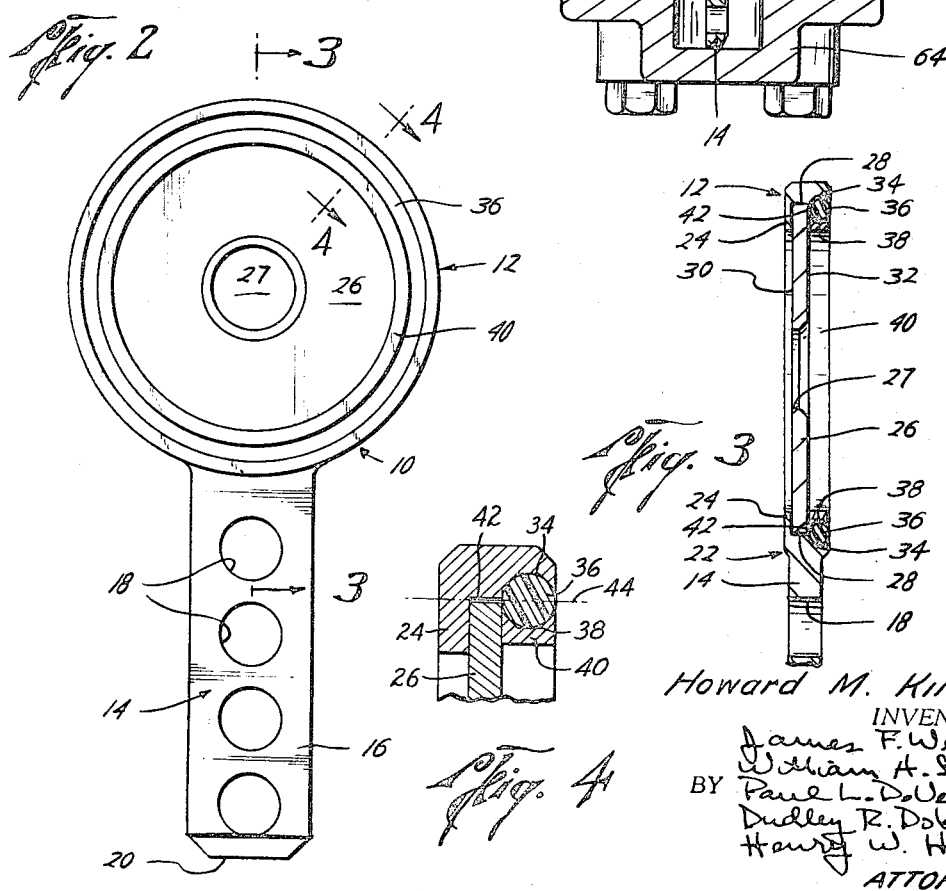

3,419,045
ORIFICE RETAINER ASSEMBLY
Howard M. King, Jr., Houston, Tex., assignor to Camco, Incorporated, Houston, Tex., a corporation of Texas
Filed Mar. 6, 1967, Ser. No. 620,874
1 Claim. (Cl. 138—44)

ABSTRACT OF THE DISCLOSURE

The present invention relates to an improved orifice plate retainer assembly. The assembly provides an improved seal between the orifice plate and the carrier plate against fluid moving in either direction, by locating a seal at the annular slot formed between the orifice and carrier plates, as well as between the sealing O-ring and carrier plate. The present invention further allows the use of a standard orifice plate.

Background of the invention

The present invention pertains to the field of orifice plates and in particular to the field of assemblies for mounting, retaining and sealing orifice plates in their carrier plates.

Prior to the present invention, modified orifice plates have been used to insure a proper seal around the orifice plate edges. These modified orifice plates have an upstanding annular flange on one face of each plate, which flange carries a groove. A facing groove is located in the carrier plate, and cooperates with the flange groove to provide means to receive and retain a resilient O-ring. Due to the dimensions of the respective parts, the O-ring is compressed between the two grooves, thereby forming a secure seal. Such structure is disclosed in the patent issued to Harold E. McGowen, Jr., No. 3,209,779, issued Oct. 5, 1965.

This prior art method suffered from the disadvantage of requiring orifice plates modified to include an upstanding flange thus preventing their reuse except with such a carrier plate. The present invention allows the use of a standard orifice plate by providing a separate retention ring to compress the O-ring and form the seal. In addition, an improved seal is provided which effectively seals the orifice assembly from fluid moving in either direction. The O-ring forms a seal at the opening formed between the orifice plate and the carrier plate, as well as with the carrier plate and the separate ring.

Summary of the invention

The present invention provides an improved orifice plate assembly which effectively seals against fluid moving from either side of the assembly. It allows the use of standard orifice plates within the assembly by the utilization of a separate ring to provide the necessary force or pressure to bring about a satisfactory seal.

It is, therefore, an object of the present invention to provide an improved orifice retainer assembly which will provide an effective seal to fluids moving from either direction.

An additional object is to provide such an orifice retainer assembly that is economical to manufacture and use.

A still further object is to provide such an assembly which will allow the use of standard orifice plates, whereby the plates may be readily interchanged.

Other and further objects, features and advantages will be apparent from the following description of a presently preferred embodiment of the invention given for the purpose of disclosure, taken in conjunction with the accompanying drawing.

Brief description of the drawing

In the attached drawing, like character references designate like parts throughout the several views which are as follows:

FIGURE 1 is a view in elevation, partly in section, of the improved orifice retainer assembly positioned within an orifice valve, FIGURE 2 is a front view of the improved orifice retainer assembly, FIGURE 3 is an elevation view, in section, of the present invention taken along section lines 3—3 of FIGURE 2, the handle portion being only partially shown; and FIGURE 4 is a partial elevation view taken along section lines 4—4 of FIGURE 2, but on a larger scale than FIGURE 2.

Description of the preferred embodiment

Turning first to FIGURES 2 and 3, the orifice retainer assembly will be described. The carrier plate generally indicated by the numeral 10, which carries an orifice plate 26, is generally comprised of two portions, the upper or ring portion 12 and the lower or handle portion 14. The handle portion 14 depends from the ring portion and is comprised of a rod or leg 16 which has tool engaging openings 18. The lowermost end 20 of the handle portion is flat to provide a surface upon which the orifice assembly may rest when mounted within a pipeline, valve, or the like.

The ring portion 12 generally consists of an annular ring 22 having steps or shoulders formed internally of the ring which define openings of varying diameters. The first of these is an internal radially extending flange 24 which defines an opening having a diameter that is slightly smaller than the diameter of the orifice plate 26. The second step is the annular shoulder 28 which is adjacent the flange 24 and which defines an opening with a diameter slightly larger than the diameter of the orifice plate 26.

The orifice plate 26 is simply a standard orifice plate. It is disk-shaped, having first and second faces or surfaces 30 and 32. The orifice 27, centrally disposed in the plate, flared outwardly adjacent the surface 32.

Turning now to the retention means for holding the orifice plate 26 in the carrier plate 10, it is partially comprised of an annular groove 34 which is formed adjacent the annular shoulder 28. The groove 34 has a flat bottom surface and walls that extend upwardly from the bottom surface at divergent angles. The retention means is further comprised of an O-ring 36. This O-ring may be made up of any suitable material which will give it the resiliency necessary to form a satisfactory seal between the orifice plate 26 and the carrier plate 10 when compressed against these members. An outer peripheral portion of the O-ring is received in the groove 34 when the O-ring is in its operative position as shown in FIGURE 3.

A retainer ring 40 having a groove 38 in its outer peripheral surface completes the retention means. The groove 38 is similar in cross-sectional configuration to the groove 34, having a flat bottom surface and divergently inclined walls. It is mounted with a portion of the O-ring 36 located within the groove 38. As can be seen from an examination of FIGURE 3, the grooves 34 and 38 are in facing relationship when the ring 40 is in position. Due to the dimensions of the respective parts, the distance between the bottoms of the grooves 34 and 38 is slightly less than the diameter of the O-ring. Accordingly, the O-ring is under compression when the retention ring 40 is in position. The forces exerted by the compressed O-ring keep the retention ring in position, and thus keeps the orifice plate 26 in position within the retainer assembly.

In the operation of the device, the orifice plate 26 is placed within the disk portion 12 of the orifice carrier plate 10 where it is received within the opening formed by the annular shoulder 28. Due to the smaller diameter of the opening formed by the flange 24, as compared to the diameter of the orifice plate 26, a portion of the surface 30 of the orifice plate rests against the flange 24. Since the fit between the outer peripheral edge of the orifice plate 26 and the outermost surface of the shoulder 28 is not a close fit, a circular or annular slot 42 will be formed between the edge of the plate 26 and the shoulder 28. The O-ring 36 is then placed about the retention ring 40 whereby a peripheral portion of the O-ring is received in the groove 38. This assembly is then inserted into the circular opening defined by the groove 34, a peripheral portion of the O-ring being received in the groove 34.

As can be seen by examination of FIGURES 3 and 4, the contact of the O-ring 36 with the orifice plate 26 and the shoulder 28 is in the slot 42. The only other contacts that the O-ring has with the assembly are with the two grooves 34 and 38. As was stated previously, the distance between the grooves 34 and 38 when the retention ring 40 is in place is less than the diameter of a cross-sectional portion of the O-ring 36. Accordingly, the retention ring 40 acts to force the O-ring 36 outwardly. This will bring about increased contact between the O-ring and the grooves 34 and 38, as well as between the O-ring and the slot 42. Since this pressure will be uniform throughout the length of the O-ring 36, complete seals are formed at these lines of contact. Thus, a seal is formed at the circular slot defined by the outer edge of the orifice plate 26 and the surface of the shoulder 28, and at the circular lines of contact between the O-ring 36 and the grooves 34 and 38.

As can best be seen in FIGURE 4, a cross-sectional diameter 44 of the O-ring 36 must be aligned with the slot 42 for the O-ring to make contact at the slot. Stated another way, the cross-sectional axis, i.e., the axis extending the circular length of the O-ring, is aligned with slot 42. In order to bring about this contact, the outside diameter of the retention ring 40 adjacent the orifice plate 26 should be less than the outside diameter of the orifice plate itself.

One use for the improved orifice retainer assembly is shown in FIGURE 1, which is a side section view of an orifice valve. The orifice retention assembly 10 is positioned generally upright within the valve assembly. The ring portion is positioned within the rotary plug 52 with the handle portion 14 depending therefrom. The rotary plug 52 is rotatably mounted within the housing generally indicated at 54. The fit between the rotary plug 52 and the carrier plate 10 is a force fit, whereby the seepage between the plug 52 and the plate 10 of fluid being conveyed through the valve is prevented.

Internally threaded tubular extensions 56 and 58 extend outwardly from the housing 54. The tubular extensions 56 and 58 receive coupling members 60 and 62, only one of which is completely shown. Fluid conveying lines are attached to the upstanding flanges on the outermost ends of the coupling members by use of the bolt holes located in these flanges in a well known manner.

Returning to the housing 54, a removable cover 64 is rotatably mounted to the bottom of housing 54 about pivot points which are not shown. It is secured in the position shown in FIGURE 1 by means of nuts and bolts. The bottom surface 20 of the handle portion 14 rests on the inside surface of the cover 64 as is shown in FIGURE 1. This properly positions the orifice plate 26 in the passageway 68 extending through the rotary plug 52 which connects with passageway 66. An upper stem 70 of the rotary plug extends upwardly from the plug itself and connects by means not shown to the upstanding lug 72. By rotating the lug 72, the rotary plug 52 and the orifice retainer assembly 10 carried in the plug, may be rotated about a vertical axis. As will be readily understood by one skilled in the art, rotation of the rotary plug 52 will bring about an opening or closing of the valve. A more complete description of the operation of the orifice valve and of the orifice assemblies in the valve is set forth in United States Patent No. 3,209,779, issued to Harold E. McGowen, Jr., on Oct. 5, 1965.

As can be seen from the previous discussion of the preferred embodiment, the present invention is well adapted to carry out the objects set forth at the outset. An economical assembly has been provided which is simple to manufacture and use, and which provides an effective seal between the carrier plate and the orifice plate. The present invention, furthermore, provides an effective seal for the assembly against fluid flowing in either direction with respect to the orifice plate assembly, should unexpected changes in pressure or flow occur. In addition, an assembly has been provided which allows the use of standard orifice plates which results in a more economical arrangement, as well as provides for interchangeability of the orifice plates.

The present invention, therefore, is well adapted to carry out the objects and attain the ends and advantages mentioned as well as other inherent therein. While a presently preferred embodiment of the invention has been given for the purpose of disclosure, numerous changes in the detail of construction and the combination, shape, size and arrangement of parts may be resorted to without departing from the spirit and scope of the invention as hereinafter claimed.

What is claimed is:
1. An orifice assembly comprising,
  a carrier plate having a ring portion for receiving an orifice plate, the ring portion including,
  an internal annular flange having a smaller diameter than said orifice plate,
  an internal annular shoulder adjacent said flange and of a larger diameter than said orifice plate and having a predetermined depth, and
  an annular groove adjacent said shoulder,
  an orifice plate having first and second sides and an outer peripheral edge and of substantially the same thickness as the depth of the shoulder, said plate being received within said ring portion and being contacted by said flange on said first side, a circular slot being formed between said outer edge of the plate and said shoulder,
  retention means for said assembly being comprised of,
  a ring adjacent the second side of said orifice plate, the outside diameter of said ring adjacent said plate being less than the outside diameter of said plate,
  a groove extending along the outermost surface of said ring and opposed to said groove in the ring portion of the carrier plate,
  a relatively resilient O-ring retained by said grooves and contacting said grooves and slot, the cross-sectional axis of said O-ring being aligned with said slot.

References Cited

UNITED STATES PATENTS

| | | | |
|---|---|---|---|
| 2,025,545 | 12/1935 | Muff | 138—44 |
| 2,407,951 | 9/1946 | Daniel | 138—44 |
| 2,743,742 | 5/1956 | Muff | 138—44 |
| 2,764,891 | 10/1956 | McGowen | 138—44 X |
| 2,896,668 | 7/1959 | Aitken | 138—44 |
| 3,126,917 | 3/1964 | Hodgeman et al | 138—44 |
| 3,209,779 | 10/1965 | McGowen | 138—44 X |

HOUSTON S. BELL, JR., *Primary Examiner.*

U.S. Cl. X.R.

137—327